United States Patent
Lee et al.

(10) Patent No.: US 11,699,819 B2
(45) Date of Patent: Jul. 11, 2023

(54) BATTERY CELL ASSEMBLY, BATTERY MODULE INCLUDING SAME BATTERY CELL ASSEMBLY, BATTERY PACK INCLUDING SAME BATTERY MODULE, AND AUTOMOBILE INCLUDING SAME BATTERY PACK

(71) Applicant: LG CHEM, LTD., Seoul (KR)

(72) Inventors: Jung-Hoon Lee, Daejeon (KR); Jae-Uk Ryu, Daejeon (KR); Dal-Mo Kang, Daejeon (KR); Min-Ho Kwon, Daejeon (KR); Jeong-O Mun, Daejeon (KR)

(73) Assignee: LG ELECTRONICS SOLUTION, LTD., Seoul (KR)

( * ) Notice: Subject to any disclaimer, the term of this patent is extended or adjusted under 35 U.S.C. 154(b) by 103 days.

(21) Appl. No.: 16/981,039

(22) PCT Filed: Sep. 10, 2019

(86) PCT No.: PCT/KR2019/011761
§ 371 (c)(1),
(2) Date: Sep. 15, 2020

(87) PCT Pub. No.: WO2020/067665
PCT Pub. Date: Apr. 2, 2020

(65) Prior Publication Data
US 2021/0050635 A1 Feb. 18, 2021

(30) Foreign Application Priority Data
Sep. 28, 2018 (KR) .................. 10-2018-0116523

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 10/643* (2015.04);
(Continued)

(58) Field of Classification Search
None
See application file for complete search history.

(56) References Cited

U.S. PATENT DOCUMENTS

2006/0216583 A1   9/2006   Lee et al.
2009/0208829 A1*  8/2009   Howard .............. F28D 15/0233
                                                429/120

(Continued)

FOREIGN PATENT DOCUMENTS

CN   201503888 U   6/2010
CN   201741734 U   2/2011
(Continued)

OTHER PUBLICATIONS

Extended European Search Report for European Application No. 19865384.2, dated Jul. 6, 2021.
(Continued)

*Primary Examiner* — Amanda J Barrow
(74) *Attorney, Agent, or Firm* — Birch, Stewart, Kolasch & Birch, LLP

(57) ABSTRACT

A battery cell assembly includes a plurality of cylindrical cell blocks, each of the plurality of cylindrical cell blocks including a plurality of cylindrical cells, a block cover configured to cover an upper side of the plurality of cylindrical cell blocks and electrically connect the plurality of cylindrical cell blocks, a cooling plate located opposite to the block cover and disposed at a lower side of the plurality of cylindrical cell blocks and a heat transfer member disposed between the cooling plate and the plurality of cylindrical cell blocks and having a plurality of thermal interface (Continued)

materials corresponding to bottom portions of the plurality of cylindrical cells.

11 Claims, 8 Drawing Sheets

(51) Int. Cl.
  *H01M 10/643* (2014.01)
  *H01M 10/6554* (2014.01)
  *H01M 10/658* (2014.01)
  *H01M 50/24* (2021.01)
  *H01M 50/213* (2021.01)
  *H01M 50/271* (2021.01)
  *H01M 50/50* (2021.01)

(52) U.S. Cl.
  CPC ..... *H01M 10/658* (2015.04); *H01M 10/6554* (2015.04); *H01M 50/213* (2021.01); *H01M 50/24* (2021.01); *H01M 50/271* (2021.01); *H01M 50/50* (2021.01); *H01M 2220/20* (2013.01)

(56) References Cited

U.S. PATENT DOCUMENTS

| | | | |
|---|---|---|---|
| 2010/0047676 A1* | 2/2010 | Park | H01M 10/425 429/93 |
| 2011/0008667 A1 | 1/2011 | Kwag et al. | |
| 2011/0206970 A1 | 8/2011 | Itoi et al. | |
| 2012/0100399 A1 | 4/2012 | Adachi et al. | |
| 2012/0121949 A1* | 5/2012 | Eberhard | H01M 10/6551 429/82 |
| 2013/0183566 A1 | 7/2013 | Wayne et al. | |
| 2013/0316202 A1 | 11/2013 | Bang et al. | |
| 2015/0064514 A1* | 3/2015 | Wu | H01M 50/20 429/120 |
| 2015/0171493 A1* | 6/2015 | Freese | H01M 10/655 429/120 |
| 2015/0280193 A1* | 10/2015 | Ohshiba | H01M 10/658 361/535 |
| 2016/0064783 A1* | 3/2016 | Chorian | H01M 10/625 429/120 |
| 2016/0093931 A1* | 3/2016 | Rawlinson | H01M 10/625 429/72 |
| 2016/0285142 A1 | 9/2016 | Kimura | |
| 2017/0098805 A1* | 4/2017 | Liu | H01M 50/24 |
| 2017/0125755 A1 | 5/2017 | Kim et al. | |
| 2018/0026321 A1* | 1/2018 | Rhodes | H01M 10/625 429/120 |
| 2018/0034012 A1 | 2/2018 | Yu et al. | |
| 2018/0198154 A1 | 7/2018 | Lee et al. | |
| 2018/0212222 A1* | 7/2018 | Barton | H01M 50/24 |
| 2019/0181508 A1* | 6/2019 | Kim | H01M 10/48 |
| 2019/0210469 A1* | 7/2019 | Yang | H01M 50/224 |
| 2019/0280267 A1* | 9/2019 | Bae | H01M 10/653 |
| 2019/0305392 A1* | 10/2019 | Day | H01M 10/0525 |
| 2019/0319232 A1* | 10/2019 | Ryu | H01M 50/249 |
| 2019/0348726 A1* | 11/2019 | Marpu | H01M 10/6556 |
| 2020/0044227 A1* | 2/2020 | Ryu | H01M 50/54 |
| 2020/0212380 A1* | 7/2020 | Kwag | H01M 10/6556 |
| 2021/0359372 A1* | 11/2021 | Wu | H01M 50/148 |

FOREIGN PATENT DOCUMENTS

| | | | | |
|---|---|---|---|---|
| CN | 202183419 U | 4/2012 | | |
| CN | 203871383 U | 10/2014 | | |
| CN | 106169546 A | 11/2016 | | |
| CN | 107431159 A | 12/2017 | | |
| CN | 107681077 A | 2/2018 | | |
| CN | 206976441 U | 2/2018 | | |
| CN | 210926080 U | 7/2020 | | |
| EP | 3 012 133 B1 | 10/2017 | | |
| EP | 3522261 A1 | 8/2019 | | |
| EP | 3660952 A1 | 6/2020 | | |
| JP | 4055257 B2 | 3/2008 | | |
| JP | 4127501 B2 | 7/2008 | | |
| JP | 2008-192570 A | 8/2008 | | |
| JP | 2011-065907 A | 3/2011 | | |
| JP | 4761727 B2 | 8/2011 | | |
| JP | 2012-033464 | * | 2/2012 | ..... H01M 2/10 |
| JP | 2012-094330 A | 5/2012 | | |
| JP | 2015-138748 A | 7/2015 | | |
| KR | 10-0696694 B1 | 3/2007 | | |
| KR | 10-2012-0107371 A | 10/2012 | | |
| KR | 10-2016-0113970 A | 10/2016 | | |
| KR | 20-2017-0000125 U | 1/2017 | | |
| KR | 10-2017-0094981 A | 8/2017 | | |
| KR | 10-2018-0009020 A | 1/2018 | | |
| KR | 10-2018-0066683 A | 6/2018 | | |
| KR | 10-2018-0081393 A | 7/2018 | | |

OTHER PUBLICATIONS

International Search Report issued in PCT/KR2019/011761 (PCT/ISA/210), dated Dec. 27, 2019.
Indian Office Action for Indian Application No. 202017055523, dated Aug. 8, 2022, with English translation.

* cited by examiner

BATTERY CELL ASSEMBLY, BATTERY MODULE INCLUDING SAME BATTERY CELL ASSEMBLY, BATTERY PACK INCLUDING SAME BATTERY MODULE, AND AUTOMOBILE INCLUDING SAME BATTERY PACK

TECHNICAL FIELD

The present disclosure relates to a battery cell assembly, a battery module including the battery cell assembly, a battery pack including the battery module, and a vehicle including the battery pack.

The present application claims priority to Korean Patent Application No. 10-2018-0116523 filed on Sep. 28, 2018 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module having at least one battery cell first, and then configure a battery pack by using at least one battery module and adding other components.

In the case of the conventional battery module or battery pack, when the battery module or the battery pack is configured as an assembly of a plurality of battery cells, the assembly type of the plurality of battery cells is also changed depending on the model type of the battery module or the battery pack.

Accordingly, in the conventional art, the shape and form of the assembly of the battery cells are also changed according to the model of the battery module or the battery pack, which makes it difficult to commonly apply the assembly. Thus, the conventional battery module or battery pack has deteriorated process efficiency since the assembly of battery cells is less compatible or expandable for various products.

In particular, when the battery cells are cylindrical cells, due to the geometrical characteristics of the cylindrical cells, when the assembly of battery cells is configured using the cylindrical cells, dead space is more likely to occur between the cylindrical cells, which is disadvantageous in terms of weight, slimming and energy density.

DISCLOSURE

Technical Problem

The present disclosure is directed to providing a battery cell assembly for common application, a battery module including the battery cell assembly, a battery pack including the battery module, and a vehicle including the battery pack.

Technical Solution

In one aspect of the present disclosure, there is provided a battery cell assembly, comprising: a plurality of cylindrical cell blocks, each cylindrical cell block including a plurality of cylindrical cells; a block cover configured to cover an upper side of the plurality of cylindrical cell blocks and electrically connect the plurality of cylindrical cell blocks; a cooling plate located opposite to the block cover and disposed at a lower side of the plurality of cylindrical cell blocks; and a heat transfer member disposed between the cooling plate and the plurality of cylindrical cell blocks and having a plurality of thermal interface materials corresponding to bottom portions of the plurality of cylindrical cells.

The plurality of cylindrical cell blocks may be shaped corresponding to each other such that neighboring cylindrical cell blocks are coupled with each other in a block type.

Each of the plurality of cylindrical cell blocks may further include a bottom cover configured to accommodate the bottom portions of the plurality of cylindrical cells; a top cover coupled to the bottom cover and configured to cover top portions of the plurality of cylindrical cells; a pair of bus bar members provided at an upper side of the top cover to electrically connect the plurality of cylindrical cells; and an insulation member provided between the pair of bus bar members.

Each of the plurality of cylindrical cell blocks may further include at least one heat insulating member configured to prevent flame spread toward neighboring cylindrical cells when at least one of the plurality of cylindrical cells is ignited.

The heat insulating member may be a plurality of heat insulating members, and the plurality of heat insulating members may include: a first heat insulating member configured to cover side surfaces of the plurality of cylindrical cells; a second heat insulating member configured to cover an upper side of the plurality of cylindrical cells and disposed at an inner side of the top cover; and a third heat insulating member spaced apart from the second heat insulating member by a predetermined distance and exposed to the upper side of the top cover.

The at least one heat insulating member may be made of a mica insulation material.

In addition, the present disclosure provides a battery module, comprising: at least one battery cell assembly according to the former embodiments; and a module case configured to package the at least one battery cell assembly.

The module case may include: a main cover configured to cover the at least one battery cell assembly; and a front cover coupled to the main cover to cover a front side of the at least one battery cell assembly.

Moreover, the present disclosure provides a battery pack, comprising: at least one battery module according to the above embodiments; and a pack case configured to package the at least one battery module.

In addition, the present disclosure provides a vehicle, comprising at least one battery pack according to the above embodiment.

Advantageous Effects

According to various embodiments as above, it is possible to provide a battery cell assembly for common application, a battery module including the battery cell assembly, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
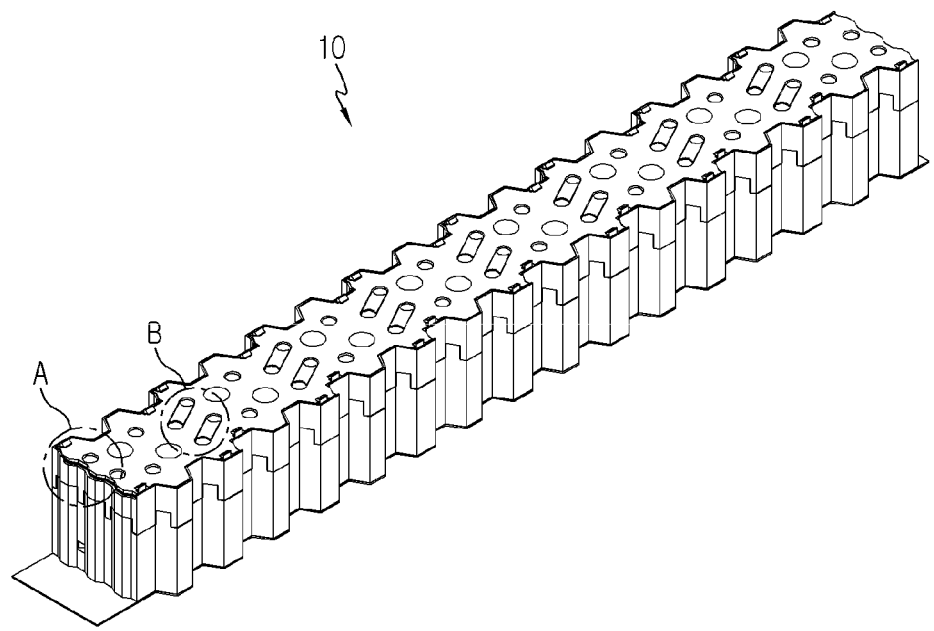
FIG. 1 is a diagram for illustrating a battery cell assembly according to an embodiment of the present disclosure.
Figure 2:
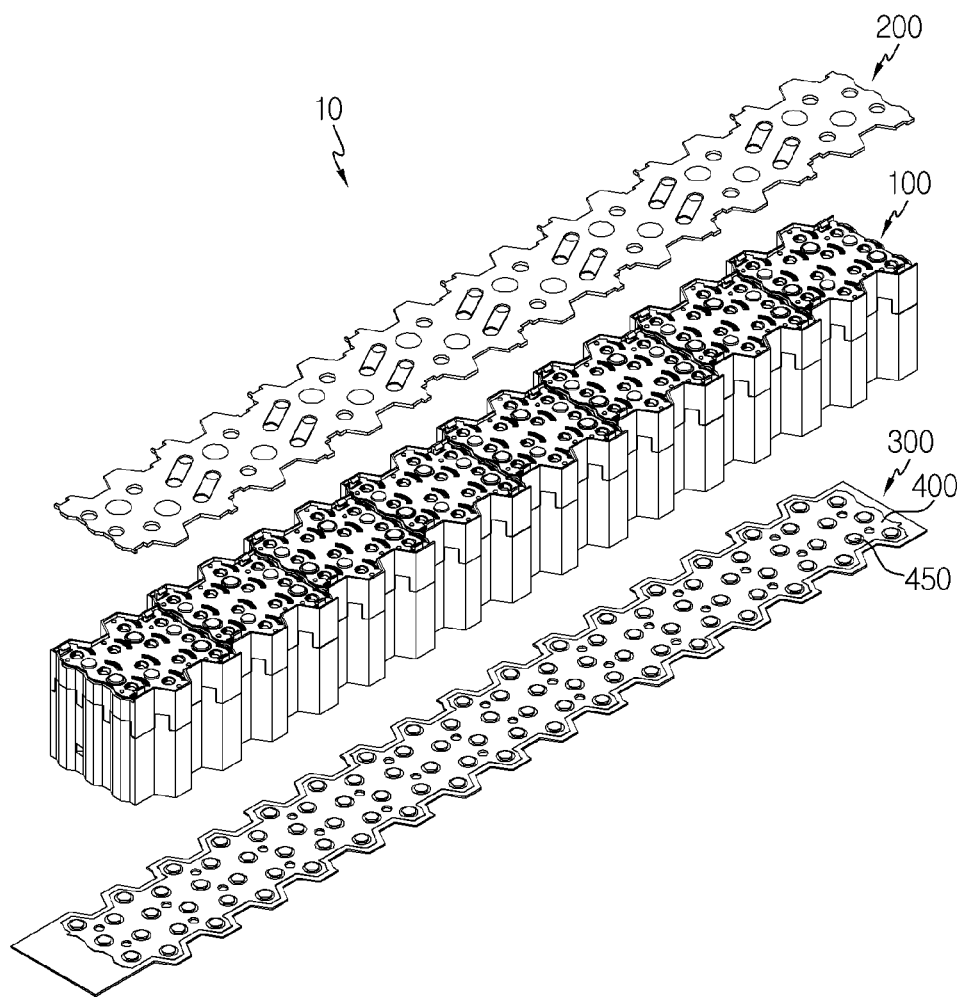
FIG. 2 is an exploded perspective view showing the battery cell assembly of FIG. 1.
Figure 3:
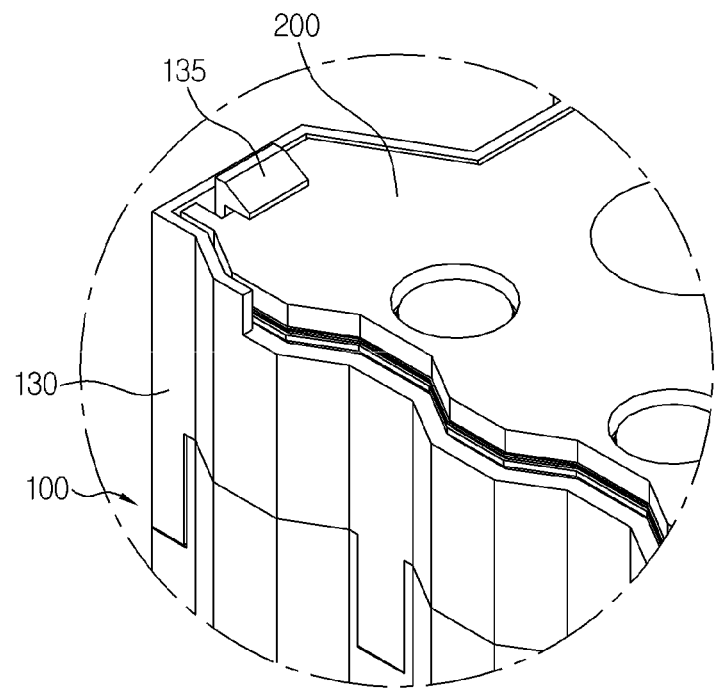
FIG. 3 is a partially enlarged view showing a portion A of the battery cell assembly of FIG. 1.
Figure 4:
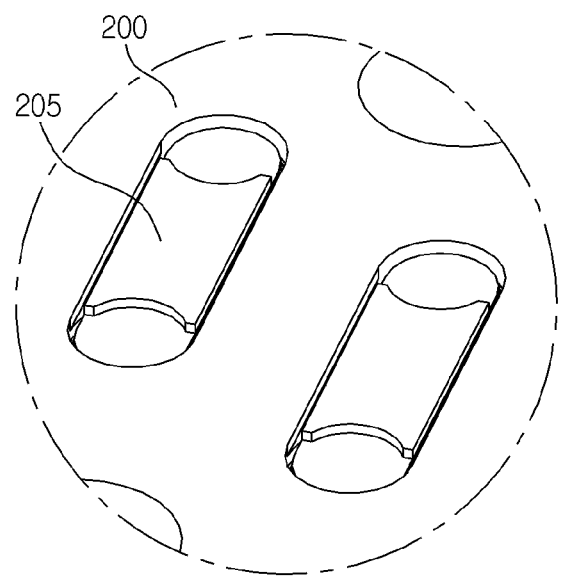
FIG. 4 is a partially enlarged view showing a portion B of the battery cell assembly of FIG. 1.
Figure 5:
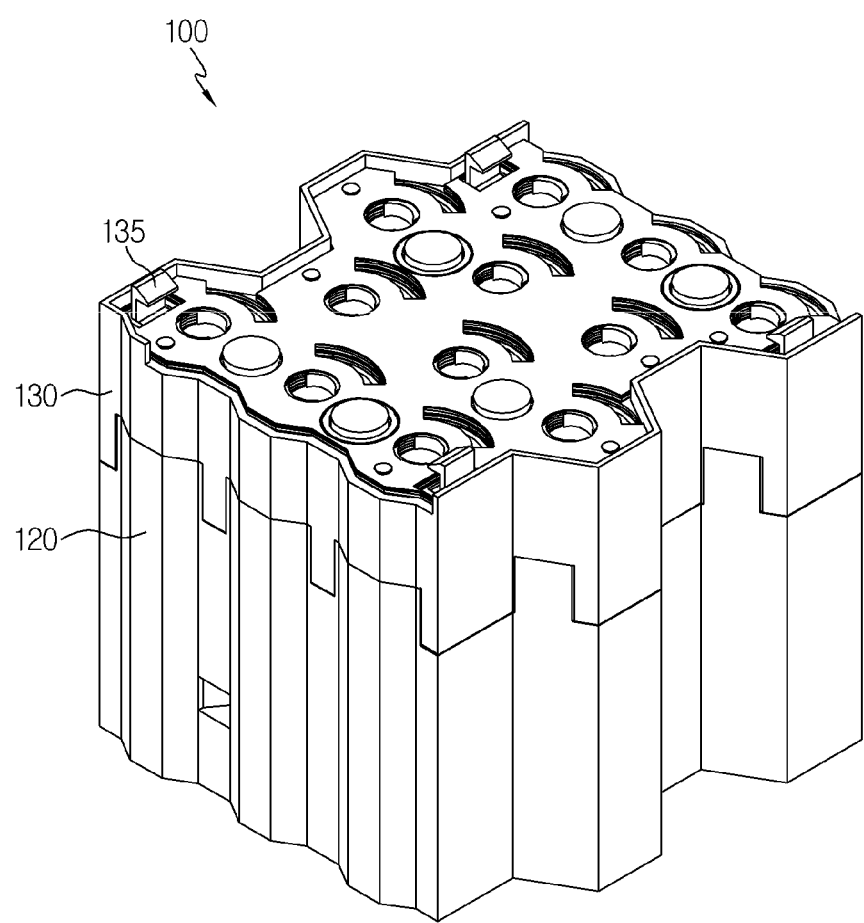
FIG. 5 is a diagram for illustrating a cylindrical cell block of the battery cell assembly of FIG. 2.
Figure 6:
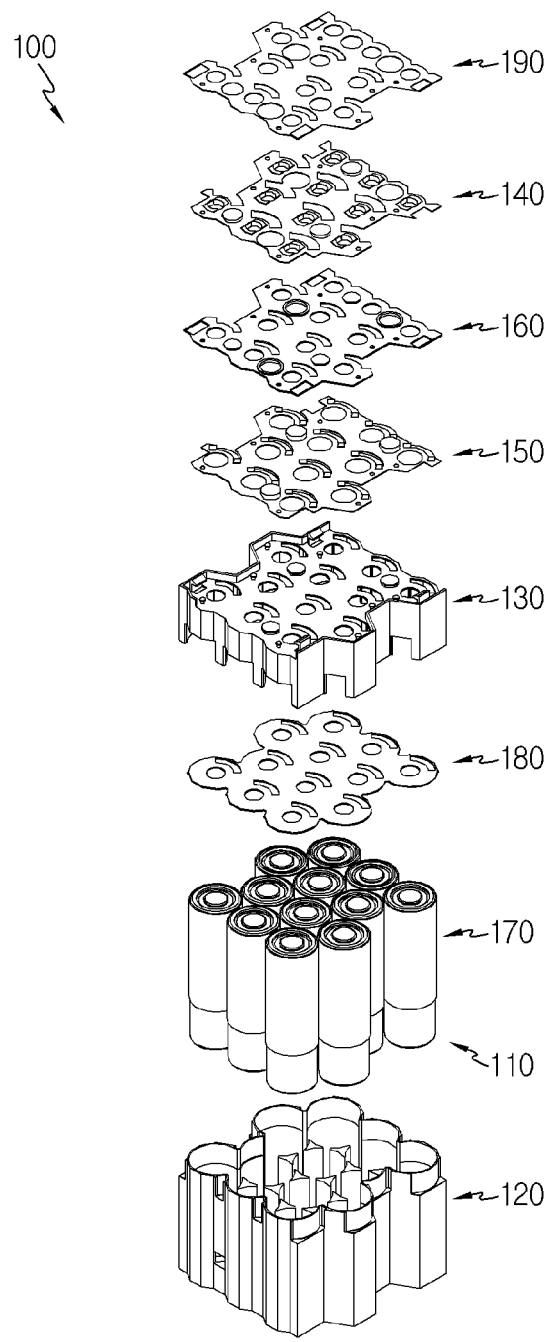
FIG. 6 is an exploded perspective view showing the cylindrical cell block of FIG. 5.
Figure 7:
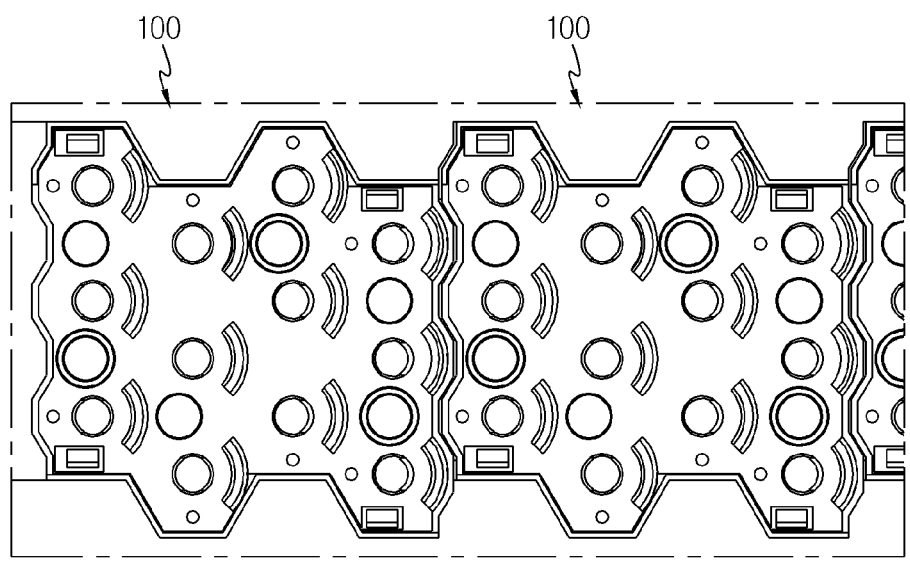
FIG. 7 is a diagram for illustrating an assembling structure of the cylindrical cell blocks of FIG. 5.

FIG. 1 is a diagram for illustrating a battery cell assembly according to an embodiment of the present disclosure, FIG. 2 is an exploded perspective view showing the battery cell assembly of FIG. 1, FIG. 3 is a partially enlarged view showing a portion A of the battery cell assembly of FIG. 1, FIG. 4 is a partially enlarged view showing a portion B of the battery cell assembly of FIG. 1, FIG. 5 is a diagram for illustrating a cylindrical cell block of the battery cell assembly of FIG. 2, FIG. 6 is an exploded perspective view showing the cylindrical cell block of FIG. 5, and FIG. 7 is a diagram for illustrating an assembling structure of the cylindrical cell blocks of FIG. 5.

Referring to FIGS. 1 to 7, the battery cell assembly 10 may include a cylindrical cell block 100, a block cover 200, a cooling plate 300 and a heat transfer member 400.

The cylindrical cell block 100 may be provided in plural. The plurality of cylindrical cell blocks 100 may be coupled with each other in a block type. To this end, the plurality of cylindrical cell blocks 100 may be shaped corresponding to each other such that neighboring cylindrical cell blocks 100 are coupled with each other in a block type.

Specifically, the outer surfaces of the plurality of cylindrical cell blocks 100 may have an uneven shape corresponding to the outer surface of a facing cylindrical cell block 100. The uneven shape may be provided to have convex portions and concave portions alternately.

Each of the plurality of cylindrical cell blocks 100 may include a cylindrical cell 110, a bottom cover 120, a top cover 130, a pair of bus bar members 140, 150, an insulation member 160 and an heat insulating member 170, 180, 190.

The cylindrical cell 110 is a secondary battery and may be provided in plural. The plurality of cylindrical cells 110 may be stacked on each other to be electrically connected to each other.

The bottom cover 120 may have an accommodation space for accommodating bottom portions of the plurality of cylindrical cells 110. The bottom cover 120 may form a part of the outer surface of the cylindrical cell block 100 and may have an outer surface of an uneven shape for coupling with the neighboring cylindrical cell block 100 in a block type.

The top cover 130 is coupled to the bottom cover 120 and may cover the top portions of the plurality of cylindrical cells 110. The top cover 130 may form an outer surface of the cylindrical cell block 100 together with the bottom cover 120, and may have an outer surface of an uneven shape for coupling with the neighboring cylindrical cell block 100 in a block type.

The top cover 130 may include a plurality of hooks 135 for more stably fixing the block cover 200, explained later. The block cover 200, explained later, may be stably fixed without departing from the top cover 130 by means of the plurality of hooks 135.

The pair of bus bar members 140, 150 may be provided to an upper side of the top cover 130. The pair of bus bar members 140, 150 may electrically connect the plurality of cylindrical cells 110.

The pair of bus bar members 140, 150 may include a positive electrode bus bar 140 and a negative electrode bus bar 150.

The positive electrode bus bar 140 is electrically connected to positive electrodes of the plurality of cylindrical cells 110 and may be disposed between the insulation member 160, explained later, and the heat insulating member 190, explained later.

The negative electrode bus bar 150 is electrically connected to negative electrodes of the plurality of cylindrical cells 110 and may be disposed between the top cover 130 and the insulation member 160, explained later.

The insulation member 160 may be provided between the pair of bus bar members 140, 150, namely between the positive electrode bus bar 140 and the negative electrode bus bar 150. The insulation member 160 may prevent direct contact that may occur between the positive electrode bus bar 140 and the negative electrode bus bar 150.

The heat insulating member 170, 180, 190 is used to prevent flame spread toward neighboring cylindrical cells 110 when at least one of the plurality of cylindrical cells 110 is ignited, and may be provided in at least one or more.

Hereinafter, this embodiment will be described based on the case where the heat insulating member 170, 180, 190 is provided in plural.

The plurality of heat insulating members 170, 180, 190 may be made of a mica insulation material and may include a first heat insulating member 170, a second heat insulating member 180 and a third heat insulating member 190.

The first heat insulating member 170 may cover the side surfaces of the plurality of cylindrical cells 110. When at least one cell among the plurality of cylindrical cells 110 is ignited, the first heat insulating member 170 may primarily prevent flame spread toward neighboring cylindrical cells 110.

The second heat insulating member 180 covers the upper side of the plurality of cylindrical cells 110 and may be disposed at the inner side of the top cover 130. When at least one cell among the plurality of cylindrical cells 110 is ignited, the second heat insulating member 180 may secondarily prevent flame spread and prevent propagation of the flame toward the bus bar member 150.

The third heat insulating member 190 is disposed to be spaced apart from the second heat insulating member 180 by a predetermined distance and may be exposed to the upper side of the top cover 130. When at least one cell among the plurality of cylindrical cells 110 is ignited, the third heat insulating member 190 may finally prevent flame spread and prevent the propagation of the flame toward the block cover 200, explained.

In this embodiment, by means of the plurality of heat insulating members 170, 180, 190 provided as the third heat insulating member 190, the second heat insulating member 180 and the first heat insulating member 170, even though at least one cylindrical cell 110 among the plurality of cylindrical cells 110 is ignited, it is possible to effectively prevent the chain ignition that may lead to the entire cylindrical cells 110.

The block cover 200 covers the upper side of the plurality of cylindrical cell blocks 100 and may electrically connect the plurality of cylindrical cell blocks 100. The block cover 200 may be fixed by means of the plurality of hooks 135.

The block cover 200 may include a cell block welding portion 205 for electrically connecting neighboring cylindrical cell blocks 100. The neighboring cylindrical cell blocks 100 may be electrically connected to each other by laser welding or the like through the cell block welding portion 205.

The cooling plate 300 is for cooling the plurality of cylindrical cells 110 and may be located opposite to the block cover 200 and disposed at the lower side of the plurality of cylindrical cell blocks 100.

The heat transfer member 400 may be disposed between the cooling plate 300 and the plurality of cylindrical cell blocks 100, and a plurality of thermal interface materials 450 may be provided thereto to correspond to the bottom portion of the plurality of cylindrical cells 110.

The plurality of thermal interface materials 450 may be in direct contact with the bottom portion of the plurality of cylindrical cells 110. Through the plurality of thermal interface materials 450, the heat generated from the plurality of cylindrical cell blocks 100 may be transferred to the cooling plate 300 more quickly.

In this embodiment, the plurality of cylindrical cells 110 may be cooled by means of the heat transfer member 400 having the plurality of thermal interface materials 450 and the cooling plate 300.

Figure 8:
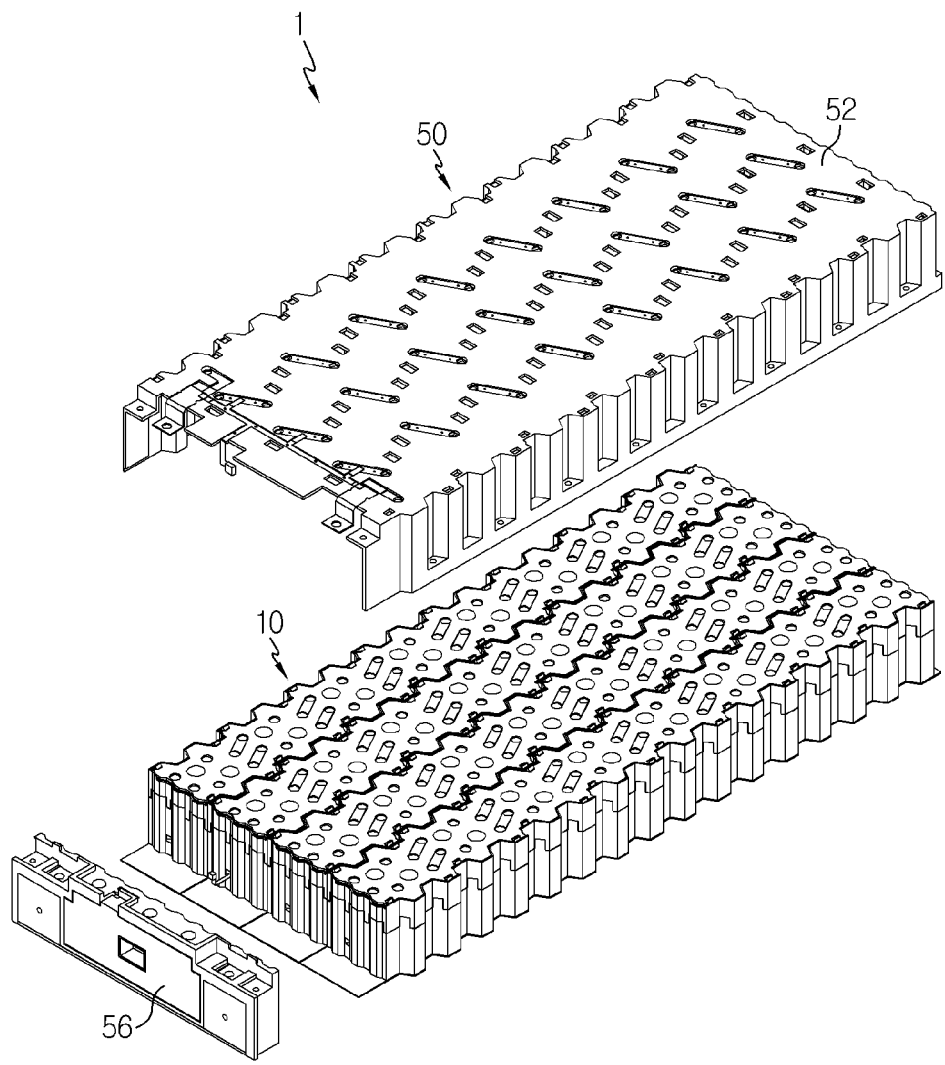
FIG. 8 is a diagram for illustrating a battery module according to an embodiment of the present disclosure.

FIG. 8 is a diagram for illustrating a battery module according to an embodiment of the present disclosure.

Referring to FIG. 8, the battery module 1 may include the battery cell assembly 10 and a module case 50.

The battery cell assembly 10 may be provided in at least one or more. Hereinafter, this embodiment will be described based on the case where the battery cell assembly 10 is provided in plural.

The outer surfaces of the plurality of battery cell assemblies 10 may have a shape corresponding to a neighboring battery cell assembly 10. Accordingly, the plurality of battery cell assemblies 10 may be connected to each other in a block type.

The module case 50 may package at least one battery cell assembly 10, or the plurality of battery cell assemblies 10 in this embodiment.

The module case 50 may include a main cover 52 and a front cover 56.

The main cover 52 may cover the at least one battery cell assembly 10, or the plurality of battery cell assemblies 10 in this embodiment. The main cover 52 may have a shape corresponding to the outer surfaces of the plurality of battery cell assemblies 10.

The front cover 56 is coupled to the main cover 52 and may cover the front side of at least one battery cell assembly 10, or the plurality of battery cell assemblies 10 in this embodiment. The front cover 56 may be connected to the main cover 52 by bolting and welding.

As described above, according to the battery module 1 of this embodiment, the battery cell assembly 10 may be configured by coupling the plurality of cylindrical cell blocks 100 to each other in a block type, and the battery module 1 may be configured by coupling the plurality of battery cell assemblies 10 to each other in a block type. For this reason, the cylindrical cell block 100 may be used as a unit in various model types. Accordingly, in this embodiment, the battery module 1 may have improved compatibility and extensibility for various products.

In addition, according to the battery module 1 of this embodiment, the plurality of cylindrical cell blocks 100 and the plurality of battery cell assemblies 10 are coupled in a block type, thereby securing easy and simple assembling in manufacturing the battery module 1. Accordingly, in this embodiment, the manufacturing process efficiency of the battery module 1 may be significantly improved.

Moreover, according to the battery module 1 of this embodiment, since the plurality of cylindrical cell blocks 100 and the plurality of battery cell assemblies 10 are coupled in a block type, it is possible to minimize a dead space that may be created between the cylindrical cells 110. Accordingly, in this embodiment, it is possible to provide the battery module 1 having a slimmer and more compact design and a high energy density.

Figure 9:
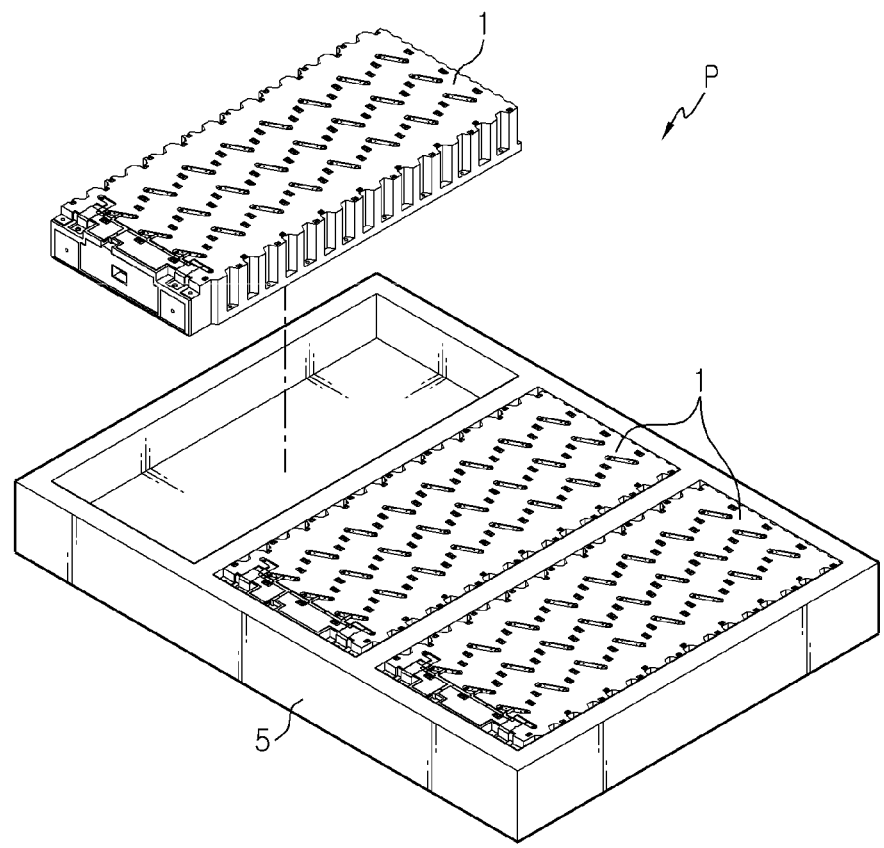
FIG. 9 is a diagram for illustrating a battery pack according to an embodiment of the present disclosure.
Figure 10:
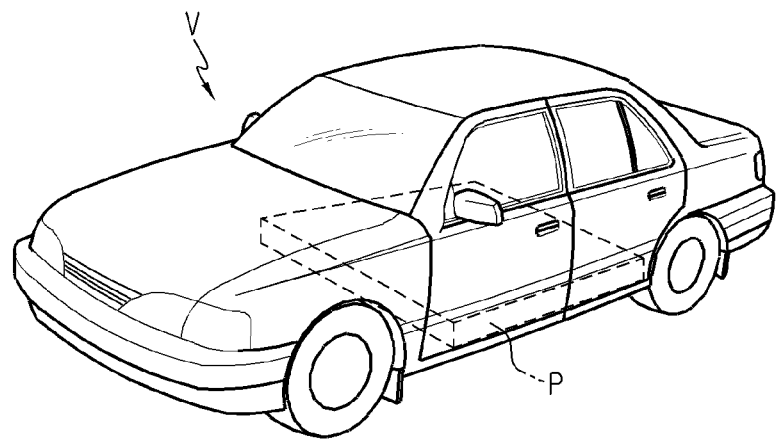
FIG. 10 is a diagram for illustrating a vehicle according to an embodiment of the present disclosure.

FIG. 9 is a diagram for illustrating a battery pack according to an embodiment of the present disclosure, and FIG. 10 is a diagram for illustrating a vehicle according to an embodiment of the present disclosure.

Referring to FIGS. 9 and 10, a battery pack P may include at least one battery module 1 according to the former embodiment and a pack case 5 for packaging the at least one battery module 1.

The battery pack P may be provided to a vehicle V as a fuel source of the vehicle V. As an example, the battery pack P may be provided to a vehicle V such as an electric vehicle, a hybrid vehicle, and various other-type vehicles capable of using the battery pack P as a fuel source.

In addition, the battery pack P may be provided in other devices, instruments or facilities such as an energy storage system using a secondary battery, in addition to the vehicle V.

As described above, the battery pack P of this embodiment and devices, instruments or facilities such as a vehicle V, which have the battery pack P, include the battery module 1 as described above, and thus it is possible to implement a battery pack P having all the advantages of the battery module 1 described above, or devices, instruments, facilities or the like such as a vehicle V, which have the battery pack P.

According to various embodiments as above, it is possible to provide the battery cell assembly 10 for common application, the battery module 1 including the battery cell assembly 10, the battery pack P including the battery module 1, and the vehicle V including the battery pack P.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery cell assembly, comprising:
   a plurality of cylindrical cell blocks, each cylindrical cell block including a plurality of cylindrical cells;
   a block cover configured to cover an upper side of the plurality of cylindrical cell blocks and electrically connect the plurality of cylindrical cell blocks;
   a cooling plate located opposite to the block cover and disposed at a lower side of the plurality of cylindrical cell blocks; and
   a heat transfer member disposed between the cooling plate and the plurality of cylindrical cell blocks and having a plurality of thermal interface materials corresponding to bottom portions of the plurality of cylindrical cells,
   wherein each of the plurality of cylindrical cell blocks includes:
   a top cover covering the plurality of cylindrical cells;
   a first heat insulating member configured to cover side surfaces of the plurality of cylindrical cells;
   a second heat insulating member configured to cover an upper side of the plurality of cylindrical cells and disposed at an inner side of the top cover; and
   a third heat insulating member spaced apart from the second heat insulating member by a predetermined distance and exposed to the upper side of the top cover.

2. The battery cell assembly according to claim 1, wherein the plurality of cylindrical cell blocks are shaped corresponding to each other such that neighboring cylindrical cell blocks are coupled with each other in a block type.

3. The battery cell assembly according to claim 2, wherein each of the plurality of cylindrical cell blocks further includes:
   a bottom cover configured to accommodate the bottom portions of the plurality of cylindrical cells;
   a pair of bus bar members provided at an upper side of the top cover to electrically connect the plurality of cylindrical cells; and
   an insulation member provided between the pair of bus bar members.

4. A battery cell assembly, comprising:
   a plurality of cylindrical cell blocks, each cylindrical cell block including a plurality of cylindrical cells;
   a block cover configured to cover an upper side of the plurality of cylindrical cell blocks and electrically connect the plurality of cylindrical cell blocks;
   a cooling plate located opposite to the block cover and disposed at a lower side of the plurality of cylindrical cell blocks; and
   a heat transfer member disposed between the cooling plate and the plurality of cylindrical cell blocks and having a plurality of thermal interface materials corresponding to bottom portions of the plurality of cylindrical cells,
   wherein each of the plurality of cylindrical cell blocks further includes:
   a bottom cover configured to accommodate the bottom portions of the plurality of cylindrical cells;
   a top cover coupled to the bottom cover and configured to cover top portions of the plurality of cylindrical cells;
   a pair of bus bar members provided at an upper side of the top cover to electrically connect the plurality of cylindrical cells; and
   an insulation member provided between the pair of bus bar members,
   wherein each of the plurality of cylindrical cell blocks includes a plurality of heat insulating members configured to prevent flame spread toward neighboring cylindrical cells when at least one of the plurality of cylindrical cells is ignited,
   wherein the plurality of heat insulating members include:
   a first heat insulating member configured to cover side surfaces of the plurality of cylindrical cells;
   a second heat insulating member configured to cover an upper side of the plurality of cylindrical cells and disposed at an inner side of the top cover; and
   a third heat insulating member spaced apart from the second heat insulating member by a predetermined distance and exposed to the upper side of the top cover.

5. A battery module, comprising:
   at least one battery cell assembly according to claim 1; and
   a module case configured to package the at least one battery cell assembly.

6. The battery module according to claim 5, wherein the module case includes:
   a main cover configured to cover the at least one battery cell assembly; and
   a front cover coupled to the main cover to cover a front side of the at least one battery cell assembly.

7. A battery pack, comprising:
   at least one battery module according to claim 5; and
   a pack case configured to package the at least one battery module.

8. A vehicle, comprising at least one battery pack according to claim 7.

9. The battery cell assembly according to claim 1, wherein each of the plurality of cylindrical cell blocks further includes:
   a bottom cover configured to accommodate the bottom portions of the plurality of cylindrical cells, the bottom cover having a bottom wall and a side wall extending upward from the bottom wall.

10. The battery cell assembly according to claim 9, wherein side walls of adjacent cylindrical cell blocks directly contact each other.

11. The battery cell assembly according to claim 9, wherein the side walls have an uneven shape for coupling with an adjacent cylindrical cell block.

\* \* \* \* \*